UNITED STATES PATENT OFFICE 2,265,453

THERAPEUTIC PREPARATION

Hans Schmidt, Wuppertal-Vohwinkel, Germany, assignor to Winthrop Chemical Company, Inc., New York, N. Y., a corporation of New York No Drawing. Application November 25, 1939, Serial No. 306,080. In Germany November 22, 1938

1 Claim. (Cl. 167—68)

This invention relates to new calcium preparations especially adapted for therapeutic use, the preparations being a stabilized form of a calcium lactate solution.

I have found that the addition of calcium hypophosphite $Ca(H_2PO_2)_2$ in suitable proportions to the calcium lactate solutions stabilizes the solutions regardless of the degree of concentration of the solution. In this way stable and neutral solutions are obtained containing 10, 20, 30, 40 and more mgs. of calcium pro cc., that is to say a calcium content higher than it can be obtained when each salt alone is employed. Therefore, it can be supposed that double compounds are formed in the solution.

If desired from a medical view point a suited, easily soluble magnesium salt, as for instance magnesium hypophosphite, magnesium chloride, magnesium acetate or magnesium gluconate may be added to the solutions.

The solutions according to my invention show a good compatibility when injected in usual manner. The especial high calcium concentrations (30 mgs. and more pro cc.) are desired for certain pharmaceutical purposes when high volumes are to be avoided. Furthermore the hypophosphite content of the solutions is valuable for therapeutic purposes.

The solutions may be manufactured by dissolving the compounds in water while warming and filling up the solutions to the desired volume.

Thus, for instance, solutions with calcium and magnesium contents as stated in the table are obtained when the following amounts of salts are dissolved in water while warming and the solutions are filled up or concentrated respectively to 100 ccs.

| Calcium | | Magnesium | 1 cc. | |
|---|---|---|---|---|
| Lactate | Hypophosphite | | Calcium | Magnesium |
| Grams | Grams | | Milligrams | Milligrams |
| 10 | 11.4 | 8.2 grams acetate | 40 | 9.2 |
| 10 | 11.4 | 7.9 grams chloride | 40 | 9.2 |
| 10 | 11.4 | 18 grams gluconate | 40 | 9.2 |
| 10 | 11.4 | | 40 | |
| 10 | 11.4 | 10 grams hypophosphite. | 40 | 9.2 |

In a similar manner stable concentrated calcium solutions can be obtained when other proportions of the salts are chosen.

I claim:

As a new therapeutic product a stabilized aqueous solution of calcium lactate containing calcium hypophosphite as a stabilizing agent said solution containing an amount of calcium lactate greater than that contained in a calcium hypophosphite-free saturated aqueous solution of calcium lactate at the temperature concerned.

HANS SCHMIDT.